(12) United States Patent
Müller et al.

(10) Patent No.: US 7,270,134 B2
(45) Date of Patent: Sep. 18, 2007

(54) SYSTEM FOR TREATING MASS-PRODUCTION PARTS

(75) Inventors: Alois Müller, Hennef-Happerschosse (DE); Martin Müller, Hennef (DE); Dirk Bube, Windeck-Imhausen (DE); Alfred Schneider, Hennef (DE)

(73) Assignee: WMV Apparatebau GmbH & Co. KG (DE)

( * ) Notice: Subject to any disclaimer, the term of this patent is extended or adjusted under 35 U.S.C. 154(b) by 574 days.

(21) Appl. No.: 10/317,944

(22) Filed: Dec. 12, 2002

(65) Prior Publication Data

US 2003/0140952 A1   Jul. 31, 2003

(30) Foreign Application Priority Data

Dec. 12, 2001   (DE)   ............................. 101 61 086

(51) Int. Cl.
*B08B 3/00* (2006.01)
*B08B 3/06* (2006.01)

(52) U.S. Cl. ............................. 134/76; 134/79; 134/82; 134/83; 134/133; 134/134; 134/135; 134/165

(58) Field of Classification Search ................. 134/66, 134/76, 78, 79, 82, 83, 133, 134, 135, 165
See application file for complete search history.

(56) References Cited

U.S. PATENT DOCUMENTS 2,416,475 A * 2/1947 Friedman .................. 134/58 R
5,086,794 A * 2/1992 Guerinat et al. .......... 134/56 R
5,228,961 A * 7/1993 Sakai ......................... 204/471
5,377,704 A * 1/1995 Huddle ........................ 134/76
5,378,287 A * 1/1995 Pedziwiatr ..................... 134/1
5,421,883 A * 6/1995 Bowden ....................... 118/73
5,472,503 A * 12/1995 Birchler ...................... 118/423

FOREIGN PATENT DOCUMENTS

| DE | AS 1 178 365 | 7/1958 |
| DE | 20 30 591 C3 | 1/1972 |
| DE | 33 43 542 A1 | 6/1985 |
| DE | 34 20 859 C2 | 12/1985 |
| DE | 42 17 615 A1 | 1/1993 |
| DE | 199 30 497 A1 | 1/2001 |

* cited by examiner

*Primary Examiner*—Joseph L. Perrin

(57) ABSTRACT

A system for treating, in liquids, a mass-production parts contained in transport baskets, comprising at least one tank which contains liquid for submerging the transport baskets, at least one transport vehicle for the transport baskets by which the transport baskets can be moved over the at least one tank, at least one basket carrier which is arranged at the transport vehicle in such a way that its height is adjustable, which is able to grip a transport basket, submerge same in the tank, rotatingly drive same around an axis and lift same out of the tank, as well as a clamp for securing the basket carrier relative to the at least one tank.

39 Claims, 5 Drawing Sheets

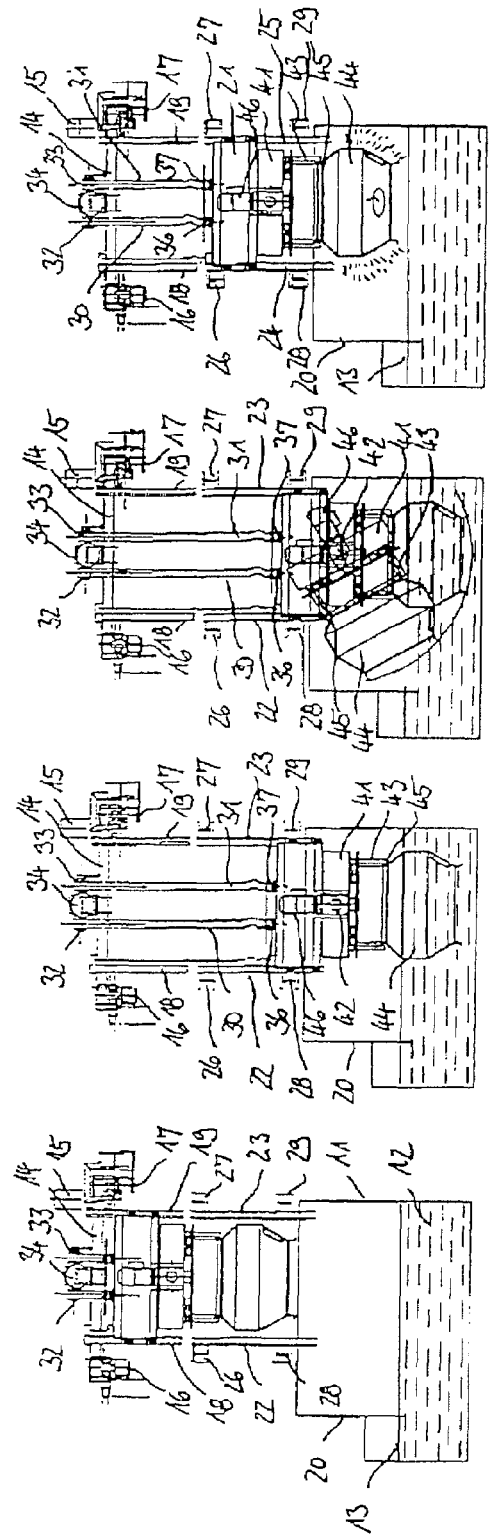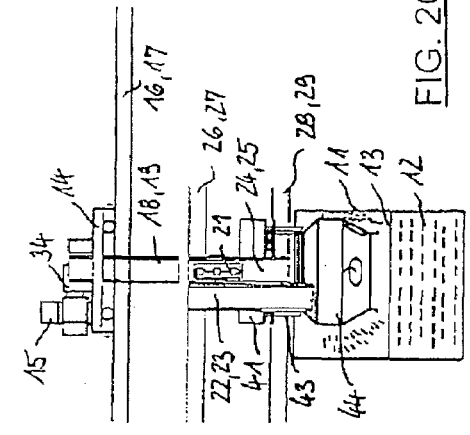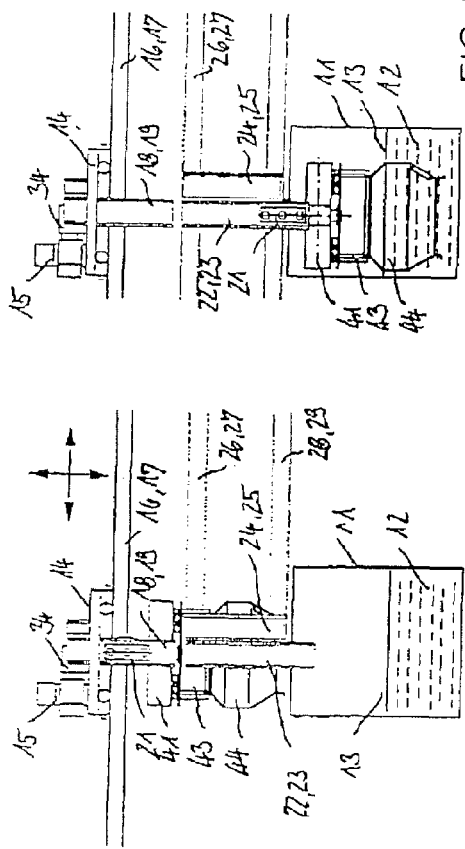

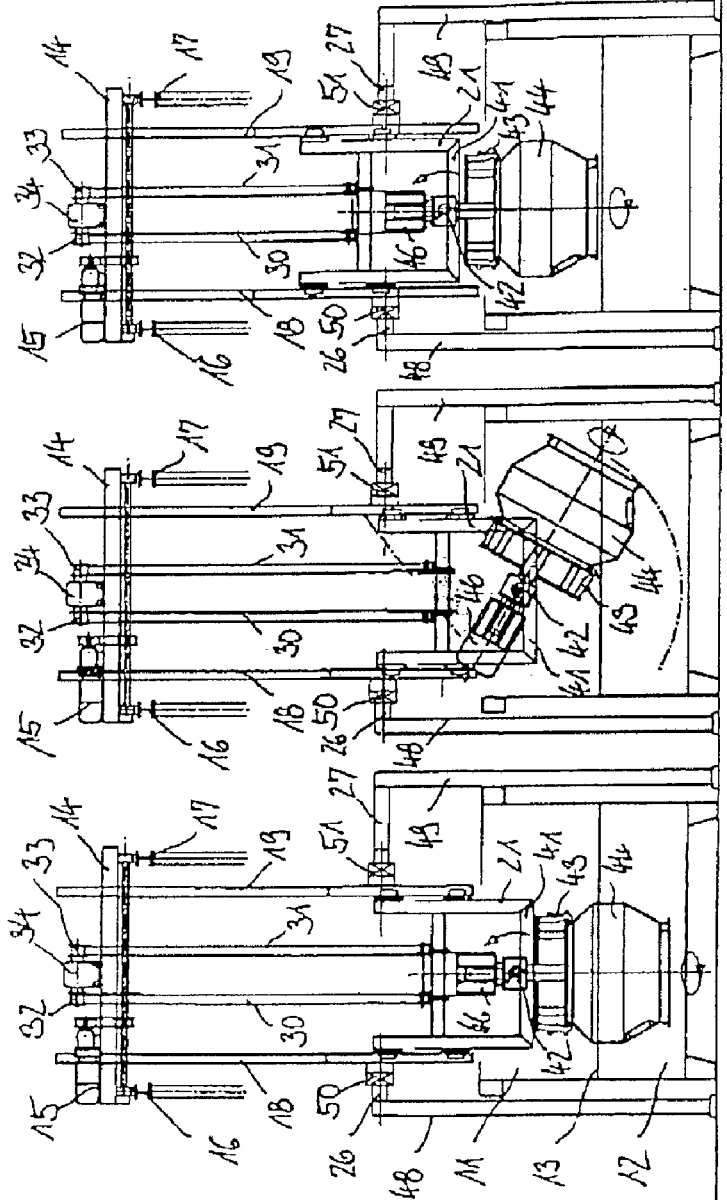

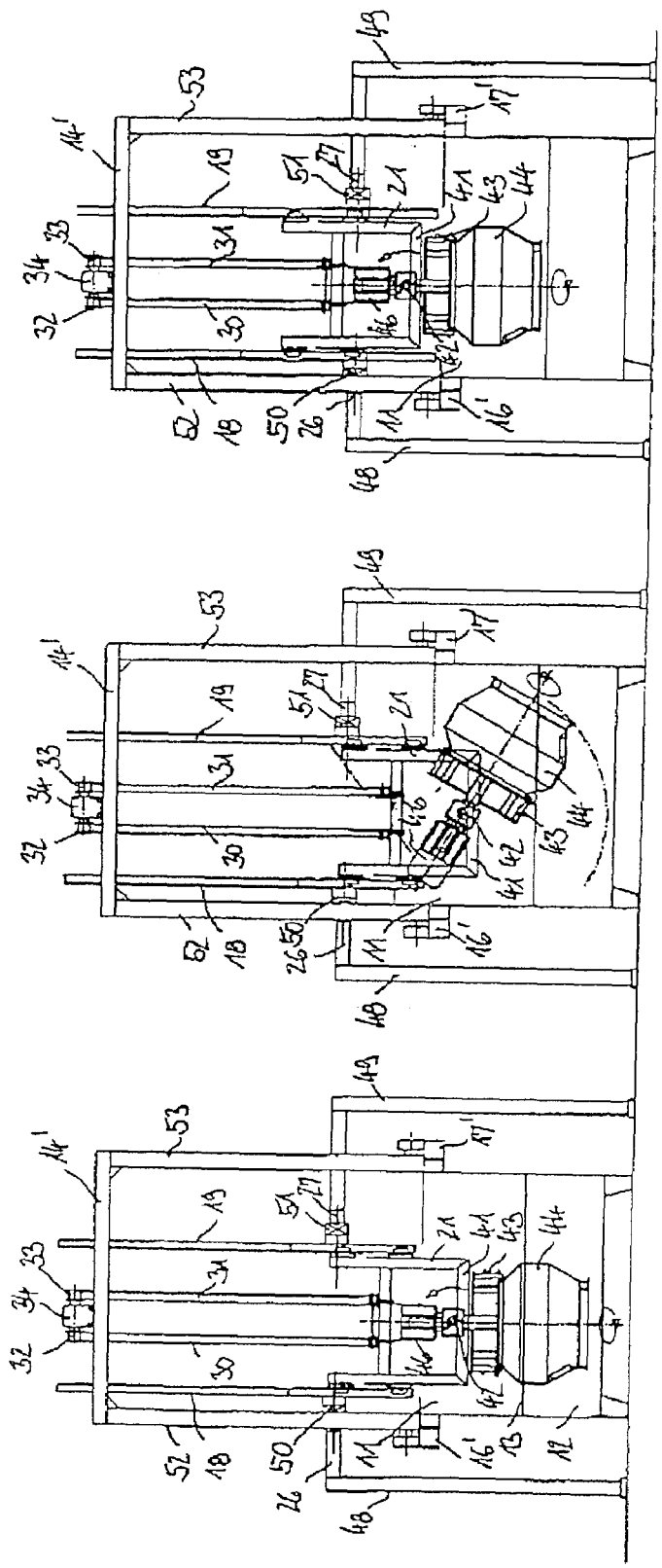

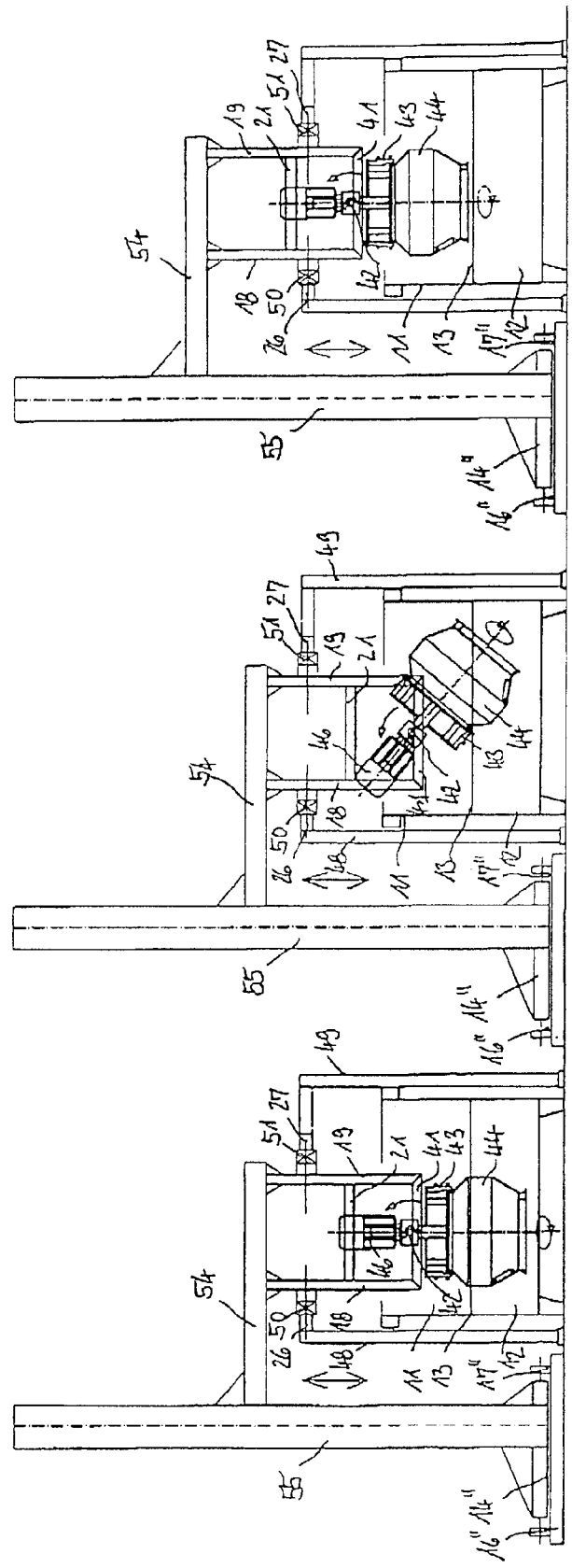

SYSTEM FOR TREATING MASS-PRODUCTION PARTS

TECHNICAL FIELD

The invention relates to a system for treating, in liquids, mass-production parts contained in transport baskets.

BACKGROUND OF THE INVENTION

A system of this type is known from DE 20 30 591 C3 wherein, at the horizontally movable transport vehicle, there are attached gripping means which are able to grip and release transport baskets. The transport baskets can be moved horizontally and picked up and deposited vertically by means of the transport vehicle. Underneath the guiding means for the transport vehicle there are arranged treatment machines and treatment chambers which can be flooded with liquid and into which transport baskets can be inserted. The treatment chambers are provided with receiving devices for the transport baskets which are provided with suitable rotary driving means. Furthermore, DE 34 20 859 C2 proposes treatment machines of the above-mentioned type wherein the receiving devices for the transport baskets with the respective rotary driving means can be pivoted around a horizontal axis to ensure that the large quantity of parts circulates in the liquid.

There are also prior art systems wherein the horizontally drivable transport vehicle is provided with gripping means for transport baskets, which gripping means comprise lifting and lowering means and their own rotary driving means for the transport baskets. Underneath the transport path of the transport vehicle there are arranged tanks which contain treatment liquid and into which the transport baskets can be lowered by lifting and lowering means. After the transport baskets have been plunged underneath the surface of the liquid, the transport baskets are driven at a slow speed around a vertical axis and subsequently lifted out of the tank in a dripping-wet condition and moved on by the transport vehicle. As a result, treatment liquid is wasted and the contents of subsequent tanks are polluted.

From DE 42 17 615 A1, there is known a system wherein a transport vehicle moves on a single rail track which is attached to a ceiling. The transport path of the transport vehicle extends across a number of treatment containers which can be filled with a liquid. At the transport vehicle there is attached a suspended holding device for receiving transport boxes via two pairs of chain pulleys which can be wound up or unwound by two independent lifting devices. The freely suspended holding device is provided with two journals which are positioned opposite one another and which can be moved into two opposed V-shaped supports which are firmly attached to the edges of the treatment containers. The transport boxes are freely inserted into the suspended holding devices. By operating the lifting devices in opposite directions, the suspended holding device can be tilted to and fro by the pairs of chain pulleys in order to re-position the mass-production parts in the transport boxes. In a lowest position in which the suspended holding device is positioned inside a treatment container, optionally underneath a liquid level, the suspended holding device is tiltably supported in the V-shaped supports, and in a higher position above the treatment container, it freely oscillates from the pairs of chain pulleys. In this higher position, the treatment liquid can merely be allowed to drip off in order to prevent same from being carried off and wasted.

SUMMARY OF THE INVENTION

It is an object of the present invention to provide a system for treating, in liquid, mass-production parts contained in transport baskets, which system incorporates the features of the initially mentioned type with fully developed treatment machines, but which has a simplified design. In this regard, the present invention provides a system for treating, in liquid, mass-production parts contained in transport baskets, comprising at least one tank which contains liquid for submerging the transport basket, at least one transport vehicle for the transport baskets, by means of which transport vehicle the transport baskets can be moved over the at least one tank, at least one basket carrier which is arranged at the transport vehicle in such a way that its height can be adjusted. The basket carrier is able to grip a transport basket, submerge same in the tank and lift same out of the tank, and is able to rotatingly drive the transport basket around an axis. The system also includes a clamping mechanism for clamping the basket carrier relative to fixed parts near the at least one tank. The clamping mechanism make it possible to securely support the basket carrier relative to a treatment tank in order to be able to drive heavy transport baskets which, when filled, may be out-of-balance, around their axes at a rotational speed which has to be increased to be able to spin off the liquid. In particular, clamping can take place in two different positions: on the one hand, with the transport basket being immersed in the liquid underneath the surface of the liquid to be able to carry out washing and rinsing processes at a low rotational speed and, on the other hand, with the transport basket being suspended above the surface of the liquid in order to carry out a centrifuging process at an increased rotational speed. In an advantageous way, it is possible to eliminate the process of pumping off the treatment liquid such as it is necessary for centrifuging purposes with treatment machines with a firmly installed drum drive and with only one clamping position. Particularly, in the case of systems for treating mass-production parts involving a number of different cleaning, coating or treatment stages with different liquids, it is advantageous that there is required only one row of simple tanks containing the respective cleaning, coating and treatment liquids, such that transport means and rotary driving means need to be provided only once at the transport vehicle.

According to a first embodiment, the transport vehicle can be moved across the at least one tank on a pair of rails suspended in a rack or from a ceiling. If the transport vehicle is attached in a suspended way, one single rail is sufficient. According to a further embodiment, in cases where the ceiling height is restricted, the transport vehicle can be moved across the tank on a pair of rails arranged on the tank edge of the at least one tank. Finally, if there are space restrictions on one side, the transport vehicle can be moved on a pair of rails arranged laterally along the at least one tank and can comprise a cantilever arm extending beyond the tank.

Because of possible out-of-balance conditions due to an unfavorable distribution of the mass-production parts, the inventive clamping mechanism which permits the centrifuging process, may require radial support with a short lever arm. The clamping mechanism at the tank can be such that, at least in a lower end position, the basket carrier lowered by the transport vehicle is guided into the clamp simply by being lowered. According to a preferred embodiment, the basket carrier comprises a slide which is movable in vertical guides. The clamping mechanism can act directly on the basket carrier. To the extent that the clamping mechanism is designed to be movable, it can be fixed to the slide and act on fixed guides or it can be secured to fixed guides and act on the slide. Finally, the clamping mechanism can be arranged fixedly and act on guides for the slide, which guides are arranged at the transport vehicle.

According to a first design, the transport vehicle comprises first vertical guides and near the at least one tank, there are fixedly attached second vertical guides into which it is possible to transfer the slide if the first and second guides are aligned. The clamping mechanism can be made to be effective at least in one lower position wherein the transport basket is submerged in the liquid in the tank underneath the liquid level between the slide and the fixed second guides. In such a case, the first guides can be relatively short and the second fixed guides at the at least one tank can be guided upwardly by a suitable amount. The second guides should extend downwardly sufficiently far for allowing clamping in a lower position, with the transport basket being positioned underneath the surface of the liquid and, without fail, in a higher position above the unchanged surface of the liquid.

According to a second design, the transport vehicle comprises first vertical guides and near the at least one tank, there are fixedly attached third vertical guides into which the slide can be transferred if the first and third guides are aligned relative to one another. In this case, the clamping mechanism become effective in a higher centrifuging position of the transport basket in the tank above the surface of the liquid between the slide and the fixed third guides.

The second and third guides can be arranged side by side, with the third guides extending less far downwardly. In particular, this is possible in those cases where the slide is clamped in at the lower ends of the second and third guides, without using a movable clamping mechanism, simply by being lowered as far as an end stop in the narrowing guides.

According to a third design, the transport vehicle comprises first vertical guides and near the at least one tank, there is fixedly attached a clamping mechanism into which the first vertical guides can be moved. The fixed clamping mechanism can be made to be effective relative to the first guides at least in one centrifuging position of the transport carrier in the tank above the surface of the liquid.

According to a preferred embodiment, the basket carrier comprises a radially feedable gripping mechanism for the transport basket. The gripping mechanism holds the transport basket on the circumference at least three times. The basket carrier comprises a rotary drive for the gripping mechanism, which rotary drive permits centrifuging at higher rotational speeds as well. A further improvement is provided wherein the basket carrier with the gripping mechanism can be pivoted around a horizontal pivot axis relative to the slide. This makes it possible to rotatingly drive the transport basket in an inclined position, in particular in a position where it is only partially immersed in liquid. As a result, there is achieved a more intense circulating movement of the mass-production parts inside the transport basket.

The horizontal pivot axis preferably extends parallel to the transport direction of the transport vehicle. This is particularly advantageous if several tanks are arranged one beside the other because, although this type of pivot movement may require a greater width of the individual tanks, the length in the direction of the side-by-side arrangement can be made to be very compact relative to the diameter of the transport basket.

In a preferred embodiment, the basket carrier is suspended from the transport vehicle via conveyor belts which can be rolled up. In parallel to the conveyor belts, there extend flexible and elastic cables or hoses as far as the basket carrier for the purpose of supplying the gripping mechanism and rotary drive with power.

According to a further embodiment, the basket carrier can be released from the transport vehicle, and the basket carrier is attached to the transport vehicle via lifting cylinders. The lifting cylinders are releasably secured to the basket carrier. In such a case, the means for supplying power to the basket carrier for the gripping mechanism and the rotary drive have to be arranged in the region of the clamping mechanism which, consequently, also has to be releasable. This means that the power supply is not connected until the basket carrier has reached its lower position and it is disconnected again after the basket carrier has been transferred into the transport vehicle.

According to an alternative embodiment, the rotary drive can be a simple, fixed friction gear drive in the region of the tank. The gripping mechanism can be kept closed by spring pretension, so that when the basket carrier is separated from the transport vehicle, there is no need for power to be supplied to the basket carrier.

The above mentioned ability to separate the basket carrier and transport vehicle from one another is advantageous in that several basket carriers can be handled by one single transport vehicle, so that if there is provided a plurality of tanks, some of these can be occupied simultaneously by a transport basket.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIGS. 1A-1D show an inventive system in a first embodiment seen in a cross-section extending perpendicularly to the direction of movement of the transport vehicle: (A) with a transport basket in a position to permit horizontal transport in its first guide; (B) with the transport basket submerged in the treatment liquid and held in a second guide; (C) with the transport basket being submerged and pivoted around a horizontal axis in the second guide; and (D) with the transport basket lifted out of the treatment liquid and held in a third guide.

FIGS. 2A-2C show an inventive system according to FIG. 1 in a longitudinal section in the direction of movement of the transport vehicle: (A) with the transport basket in a position to permit horizontal transport in its first guide; (B) with the transport basket in a position where it is submerged in the treatment liquid and held in a second guide; and (C) with the transport basket in a position where it is fixed above the surface of the liquid and held in a third guide.

FIGS. 4A-4C show an inventive system according to FIG. 3 in cross-sections extending perpendicularly relative to the direction of movement of the transport vehicle: (A) with the transport basket submerged in the treatment liquid; (B) with the transport basket submerged and pivoted around a horizontal axis; and (C) with the transport basket lifted out of the treatment liquid.

FIGS. 5A-5C show an inventive system which is similar to that shown in FIG. 3 in cross-sections extending perpendicularly relative to the direction of movement of the transport vehicle in a third embodiment: (A) with the transport basket submerged in the treatment liquid; (B) with the transport basket submerged and pivoted around a horizontal axis; and (C) with the transport basket lifted out of the treatment liquid.

FIGS. 6A-6C show an inventive system similar to that shown in FIG. 3 in cross-sections extending perpendicularly relative to the direction of movement of the transport vehicle in a fourth embodiment: (A) with the transport basket submerged in the treatment liquid; (B) with the transport basket submerged and pivoted around a horizontal axis; and (C) with the transport basket lifted out of the treatment liquid.

DETAILED DESCRIPTION OF THE INVENTION

Figure 3:
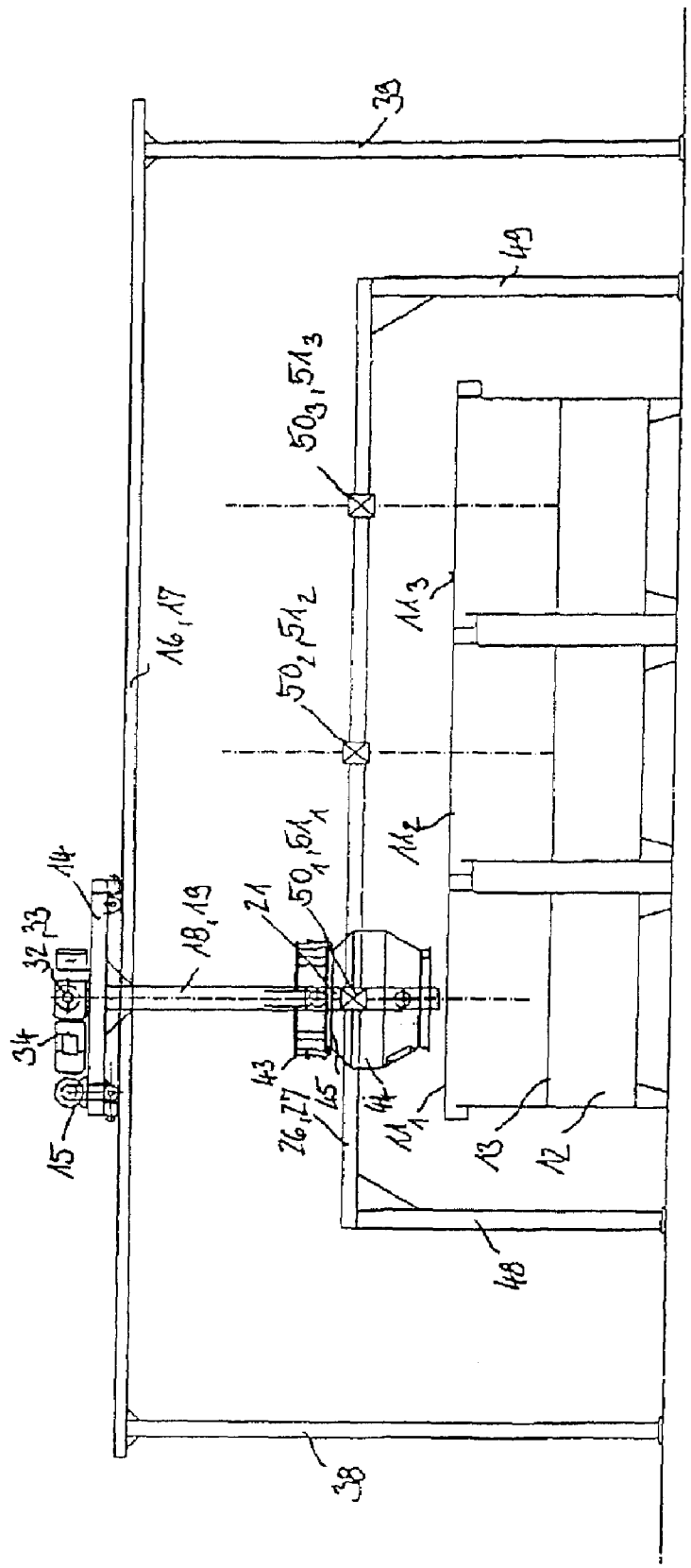
FIG. 3 shows an inventive system with three tanks in a second embodiment in a view directed perpendicularly relative to the direction of movement of the transport vehicle.

FIGS. 1 and 2 will be described jointly below.

The inventive system normally comprises a row of tanks 11 which are filled with a treatment liquid 12 up to a liquid level 13. Above the tanks 11, there is arranged a pair of rails 16, 17 on which at least one transport vehicle 14 can be moved in the longitudinal direction across the row of tanks 11. Relative to the center of the pair of rails 16, 17, the tanks 11 comprise widened regions 20 on one side. The transport vehicle 14 comprises a driving motor 15.

At the transport vehicle 14, there is attached a pair of vertical first guides 18, 19 in which it is possible, vertically, to move a slide 21 to which there is secured a basket carrier 41. At each tank, there are arranged two pairs of further vertical, fixed guides 22, 23, 24, 25 which, with respect to guide width and design, correspond to the guides 18, 19. With the transport vehicle being held in a suitable position, the guides directly follow one another in the longitudinal direction in such a way that the slide 21 can be transferred from the guides 18, 19 into the guides 22, 23 or into the guides 24, 25. The fixed second guides 22, 23 extend further downwards than the fixed third guides 24, 25. At the lower ends of the guides 22, 23, 24, 25 or at the slide 21, there is provided a clamping mechanism which is able to clamp the slide together with the respective pair of fixed guides in a play-free way. In the most simple embodiment, the clamping mechanism includes a narrowed region at the lower ends of the fixed guides, with the slide 21 preferably being provided with guiding rollers engaging the guide. In a further embodiment, the clamping mechanism can comprise of expanding jaws which are secured to the slide 21 and which become fixed relative to the fixed guides. The fixed guides 22, 23, 24, 25 are held in pairs of longitudinally extending beams 26, 27, 28, 29 which, in turn, are anchored and fixed at the building end.

The slide 21 is attached at the transport vehicle 14 to conveyor belts 30, 31 which can be wound up on pulleys or drums 32, 33 by means of a driving motor 34. The different stopping positions of the basket carrier 41 can be predetermined and controlled by contact-free proximity switches at the slide 21 on the one hand and at the guides at the other hand. The conveyor belts 30, 31 with the respective lifting driving motor 34 can be replaced by lifting cylinders. In the present case, the lifting belts comprise fixed articulation points 36, 37 at the slide 21. The fixed articulation points 36, 37 can be in the form of a suspending shackle. However, the lifting cylinders could also be releasably provided at this point. A basket carrier 41 is attached to the slide 21 so as to be pivotable around a horizontal pivot axis 42. The respective driving means are not shown in detail. They can be provided in the form of an actuating cylinder having a lever effect on the slide and on the basket carrier. Furthermore, the basket carrier 41 comprises circumferentially distributed, radially movable gripping mechanism 43 which is able to grip a transport basket 44 with an open-worked casing at an upper basket edge 45. There are preferably provided three uniformly circumferentially distributed, radially movable gripping arms.

In FIGS. 1A and 2A, the slide 21 with the first guides 18, 19 has been moved into the region of the fixed second guides 22, 23, with the lower edge of the transport basket 44 attached to the basket carrier 41 being positioned above the upper edge of the tank 11. In this position of the basket carrier 41, the transport vehicle 14 can be moved horizontally. In the position as illustrated in FIGS. 1A and 2A, the pair of the first guides 18, 19 at the transport vehicle 14 has been moved into a position where it is aligned with the second guides 22, 23 at the tank 11.

As shown in FIGS. 1B, 2B, in the above-mentioned stopping position of the transport vehicle 14, the slide 21, by unwinding the conveyor belts 30, 31, was lowered into the fixed guides 22, 23 where, at their lower ends, it was clamped to clamping mechanism not illustrated in greater detail. In this position of the basket carrier 41, the transport basket 44 is largely submerged in the liquid underneath the surface 13 of the treatment liquid 12.

It can be seen in FIG. 1C that, when the slide 21 is fixed at the lower ends of the guides 22, 23, the transport basket 44 with the basket carrier 41 can be pivoted around a horizontal axis 42 from a vertical position into an inclined position. In the inclined position, the transport basket 44 is only partially submerged underneath the surface 13 of the treatment liquid 12. In the inclined position, the transport basket 44 is rotatingly drivable by a rotary driving motor 46 in the basket carrier 41, so that the mass-production parts contained in the transport basket 44 are constantly circulated in the treatment liquid, with inner ribs in the transport basket 44 being able to intensify the circulation process. In this position, the transport basket 44 makes use of the widened region 20 on one side of the tank 11.

FIGS. 1D, 2C show the position of the basket carrier, after the basket carrier had initially been pivoted back into the position as shown in FIGS. 1B, 2B and subsequently lifted into the transport position as shown in FIGS. 1A, 2A. Subsequently, the transport vehicle 14 is displaced to the right into a stopping position until the first guides 18, 19 at the transport vehicle are aligned with the shorter, fixed third guides 24, 25 at the tank. Thereafter, the slide 21, by unwinding the conveyor belts 30, 31, was lowered as far as the lower ends of the fixed third guides 24, 25 where it was fixed by the clamping mechanism. In this position, the transport basket 44 can now by driven by the rotary driving motor 46 in the basket carrier 41 at a high rotational speed, with any treatment liquid adhering to the mass-production parts being spun off through the open-worked basket surface. At the end of this process, the slide 21 can be lifted back into the transport position as shown in FIGS. 1A, 2A, whereupon the transport vehicle 14 can be moved on the rails 16, 17 horizontally relative to a further tank which is filled with a different treatment fluid and wherein the process shown here, including all the stages according to FIG. 1, as shown in 1A, 1B, 1C and 1D or including at least the stages according to FIG. 2, as shown in 2A, 2B and 2C, is repeated.

FIGS. 3 and 4 will be described jointly below.

The inventive system comprises a series of three tanks 11 which, at small distances, are arranged one behind the other in a row. The tanks 11 are filled with a treatment liquid 12 up to a liquid level 13. Above the tank 11, there is arranged a pair of rails 16, 17 on which there is movable a transport vehicle 14 in the longitudinal direction over the row of tanks 11. The pair of rails is positioned on stands 38, 39, but it could also be suspended from a ceiling. Relative to the center of the pair of rails 16, 17, the tanks 11 are eccentrically offset.

The transport vehicle 14 comprises a driving motor 15. In the transport direction, the transport vehicle 14 is stopped centrally above the first tank $11_1$. At the transport vehicle 14, there is attached a pair of vertical first guides 18, 19 in which there is movable a slide 21 in which there is held a transport basket 44. At each of the tanks, there is arranged a pair of fixed clamping mechanism 50, 51, with the distance therebetween being adapted to the width of the guides 18, 19 such that they can cooperate with the guides 18, 19. When the transport vehicle is stopped centrally above each tank 11, the guides 18, 19 can be fixed by the clamping mechanisms 50, 51. The clamping mechanisms 50, 51 can be provided in the form of fixed clamping jaws which, in the stopping position of the transport vehicle 14, clamp in the guides 18, 19 at their respective free ends. The clamping mechanisms 50, 51 are arranged at pairs of longitudinally extending beams 26, 27 which are stacked on stands 48, 49. The beams 26, 27 could also be anchored and fixed in other ways at the building end.

The slide 21 is attached at the transport vehicle 14 at conveyor belts 30, 31 which can be wound up on drums 32, 33 by means of a driving motor 34 and by means of which the slide 21 can be stopped in positions at different levels in the guides 18, 19, which guides it does not leave at any time while moving up and down. The first guides 18, 19 end just above the tank 11.

At the slide 21, there is attached a basket carrier 41 so as to be pivotable around a horizontal pivot axis 42 which is aligned in the transport direction. At the basket carrier 41, there is arranged a gripping mechanism 43 which is able to grip the transport basket 44 which is provided with an open-worked casing at the upper basket edge 45 of same.

In FIG. 4, the slide 21 has been moved into the first guides 18, 19 between the fixed clamping mechanisms 50, 51 above a tank 11, with the lower edge of the transport basket 44 attached to the basket carrier 41 being positioned above the upper edge of the tank 11. In this position of the slide 21, the transport vehicle 14 can be displaced horizontally.

FIG. 4A shows how the slide 21, by unwinding the conveyor belts 30, 31, can be lowered from the stopping position of the transport vehicle 14 as shown in FIG. 3 into the guides 18, 19 where it is stopped at the lower ends of same. In this position of the slide 21, the transport basket 44 is largely submerged under the surface 13 of the treatment liquid. The clamping mechanisms 50, 51 are activated and clamp in the guides directly above the slide. In this position of the transport basket, the latter can be driven by a rotary driving motor 46 around its axis in order to treat the mass-production parts contained in the transport basket 44 in the treatment liquid 12.

As shown in FIG. 4B, with the slide 21 being held at the lower ends of the guides 18, 19 in an unchanged position, the transport basket 44 with the basket carrier 41 can be pivoted from the previously vertical position into an inclined position. The transport basket moves close to the edge of the laterally offset tank $11_1$. In this inclined position, the transport basket 44 is only partially submerged underneath the surface 13 of the treatment liquid 12. In the inclined position, the transport basket is rotatingly drivable by rotary driving motor 46 in the basket carrier 41, so that the mass-production parts contained in the transport basket 44 are circulated in the treatment liquid.

FIG. 4C shows a position of the slide 21 which is lifted relative to the treatment positions shown in FIGS. 4A and 4B. The slide 21 is positioned directly above the clamping mechanisms 50, 51 and the lower edge of the transport basket 44 is positioned above the liquid level 13. In this position, the transport basket 44 can be driven by the rotary driving motor 46 in the basket carrier 41 at a high speed, with any treatment liquid adhering to the large quantity of parts being spun off by the open-worked basket casing.

At the end of this process, the slide 22 can be lifted again into the transport position as shown in FIG. 3, whereupon the transport vehicle 14 can be moved horizontally on the rails 16, 17 to the next tank $11_2$ or 113 which is filled with a different treatment liquid or rinsing liquid and wherein the process described here in connection with the slides is repeated as shown in FIGS. 4A-4C.

FIG. 5 shows a system similar to that illustrated in FIG. 4, analogously to the positions of the slide 21 and of the basket carrier 41 as shown in FIG. 4, in three different positions. FIG. 5 deviates from FIG. 4 in that there is provided a pair of rails 16', 17' at the edge of the tank 11, which pair of rails extends along the row of tanks 11. While the guides 18, 19 are identical to those shown in FIG. 4, the transport vehicle 14' is provided in the form of a portal vehicle which comprises high legs 52, 53 and runs on the rails 16', 17' and is displaceable in the longitudinal direction above the row of tanks. Otherwise, reference is made to the description of FIG. 4. Identical details have been given the same reference numbers.

FIG. 6 shows a system similar to that illustrated in FIG. 4, analogously to the positions of the slide 21 and of the basket carrier 41 as shown in FIG. 4, in three different positions. The vehicle 14" is provided in the form of a side vehicle which is laterally displaceable on a pair of rails 16", 17" along the tanks 11. At the vehicle 14", on a vertical stand 55, there is secured a cantilever arm 54 whose height is adjustable and to which there are secured shorter first rails 18", 19" into which there is inserted a slide 21. Because the height of the cantilever arm 54 is adjustable, there is no need for adjusting the height of the slide 21 in the guides 18", 19". Otherwise reference is made to the description of FIG. 4. Identical details have been given the same reference numbers. The embodiment shown here can be modified in that the cantilever arm 54 is arranged in a high position at the side vehicle, with the slide 21 then being able to be held, and with its height being adjustable, in corresponding longer first guides 18, 19—as mentioned in connection with the previously described embodiment—by means of conveyor belts.

In the embodiments according to FIGS. 5 and 6, the guides 18, 19 are clamped in by the clamping mechanisms 50, 51 in the positions as illustrated.

From the foregoing, it can be seen that there has been brought to the art a new and improved system for treating mass-production parts that has a simplified construction and is efficient. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A system for treating, in liquids, mass-produced parts which are contained in transport baskets, comprising:
   at least one tank which contains liquid for submerging selected transport baskets;
   at least one transport vehicle for moving a transport basket over the at least one tank;
   at least one basket carrier which is arranged at the transport vehicle, the basket carrier having an adjustable height, and being adapted to grip the transport basket, submerge same in the tank in a washing position in the liquid and lift same out of the tank in a centrifuging position above the liquid, and being adapted to rotatingly drive the transport basket around a vertical axis thereof, and
   a clamping mechanism effective for clamping the basket carrier relative to fixed basket carrier guides near the at least one tank, wherein the clamping mechanism is operable to clamp the basket carrier at least in said centrifuging position of the transport basket above the liquid in the at least one tank, and wherein the clamping mechanism comprises expandable jaws, or a narrowed region at lower ends of the fixed guides engaging corresponding basket carrier rollers.

2. A system according to claim 1, wherein the transport vehicle can be moved across the at least one tank on rails attached in a rack or at a ceiling.

3. A system according to claim 2, wherein the basket carrier comprises a slide which is movable in the basket carrier guides which are arranged vertically.

4. A system according to claim 1, wherein the transport vehicle can be moved across the at least one tank on rails attached to an edge of the at least one tank.

5. A system according to claim 4, wherein the basket carrier comprises a slide which is movable in the basket carrier guides which are arranged vertically.

6. A system according to claim 1, wherein the transport vehicle can be moved on rails arranged laterally along the at least one tank and comprises a cantilever arm extending beyond the tank.

7. A system according to claim 6, wherein the basket carrier comprises a slide which is movable in the basket carrier guides which are arranged vertically.

8. A system according to claim 1, wherein the basket carrier comprises a slide which is movable in the basket carrier guides which are arranged vertically.

9. A system according to claim 8, wherein the basket carrier comprises a gripping mechanism for the transport basket.

10. A system according to claim 9, wherein the basket carrier comprises a rotary drive for the transport basket.

11. A system according to claim 9, wherein the basket carrier with the gripping mechanism is pivotable around a horizontal pivot axis relative to the slide.

12. A system according to claim 11, wherein the horizontal pivot axis extends parallel relative to the transport direction of the transport vehicle.

13. A system according to claim 8, wherein the basket carrier comprises a rotary drive for the transport basket.

14. A system according to claim 13, wherein the basket carrier comprises a gripping mechanism which is pivotable around a horizontal pivot axis relative to the slide.

15. A system according to claim 14, wherein the horizontal pivot axis extends parallel relative to the transport direction of the transport vehicle.

16. A system according to claim 13, wherein a power supply for the rotary drive extends from the transport vehicle to the basket carrier.

17. A system according to claim 16, wherein the power supply for the rotary drive leads from the second guides or the third guides to the basket carrier, and is disconnectable.

18. A system according to claim 8, wherein the basket carrier is attached to the transport vehicle via conveyor belts which can be rolled up.

19. A system according to claim 8, wherein the basket carrier is releasably attached to the transport vehicle.

20. A system according to claim 8, wherein the clamping mechanism is operable to clamp the basket carrier in a position of the transport basket above the liquid in the at least one tank.

21. A system according to claim 1, wherein the basket carrier comprises a slide, and the transport vehicle comprises first guides, and proximate to the at least one tank, there are fixedly arranged second vertical guides into which the slide can be transferred if the first and second guides are aligned, and, at least in one submerged position of the transport basket in the tank, the clamping mechanism can be put into effect below the liquid level between the slide and the fixed second guides.

22. A system according to claim 1, wherein the basket carrier comprises a slide, and the transport vehicle comprises first vertical guide, and proximate the at least one tank, there are fixedly attached third vertical guides into which the slide can be transferred when the first and third guides are aligned, and the clamping mechanism can be put into effect in a centrifuging position of the transport basket in the tank above the liquid level between the slide and the fixed third guides.

23. A system according to claim 1, wherein the basket carrier comprises a gripping mechanism for the transport basket.

24. A system according to claim 23, wherein the basket carrier comprises a rotary drive for the transport basket.

25. A system according to claim 1, wherein the basket carrier comprises a rotary drive for the transport basket.

26. A system according to claim 25, wherein a power supply for the rotary drive extends from the transport vehicle to the basket carrier.

27. A system according to claim 25, wherein the clamping mechanism is operable to clamp the basket carrier in a position of the transport basket above the liquid in the at least one tank.

28. A system according to claim 1, wherein the basket carrier is attached to the transport vehicle via conveyor belts which can be rolled up.

29. A system according to claim 1, wherein the basket carrier is releasably attached to the transport vehicle.

30. A system according to claim 1, wherein the basket carrier is adapted to grip the transport basket from above, and the basket carrier comprises a rotary drive for the transport basket.

31. A system for treating, in liquids, mass-produced parts which are contained in transport baskets, comprising:
   at least one tank which contains liquid for submerging selected transport baskets;
   at least one transport vehicle for moving a transport basket over the at least one tank;
   at least one basket carrier which is arranged at the transport vehicle, the basket carrier having an adjustable height, and which is adapted to grip the transport basket with a radially movable gripping mechanism, submerge same in the tank and lift same out of the tank, and which is adapted to rotatingly drive the transport basket around a vertical axis thereof with a rotary drive, wherein the gripping mechanism is pivotable around a horizontal pivot axis; and a clamp effective for clamping the basket carrier relative to fixed parts proximate the at least one tank.

32. A system according to claim 31 wherein the horizontal pivot axis extends parallel relative to the transport direction of the transport vehicle.

33. A system according to claim 31 wherein the basket carrier is releasably attached to the transport vehicle.

34. A system according to claim 31, wherein the transport vehicle can be moved across the at least one tank on rails attached in a rack or at a ceiling.

35. A system according to claim 31, wherein the transport vehicle can be moved across the at least one tank on rails attached to an edge of the at least one tank.

36. A system according to claim 31, wherein the transport vehicle can be moved on rails arranged laterally along the at least one tank and comprises a cantilever arm extending beyond the tank.

37. A system according to claim 31, wherein the basket carrier comprises a slide which is movable in vertical guides.

38. A system according to claim 31, wherein the clamp is operable to clamp the basket carrier in a position of the transport basket above the liquid in the at least one tank.

39. A system according to claim 31, wherein the basket carrier is adapted to grip the transport basket from above, and the basket carrier comprises a rotary drive for the transport basket.

* * * * *